Aug. 1, 1933.  I. R. METCALF  1,920,417
CONVEYING MECHANISM FOR A STITCHING MACHINE AND THE LIKE
Filed May 27, 1929    2 Sheets-Sheet 1
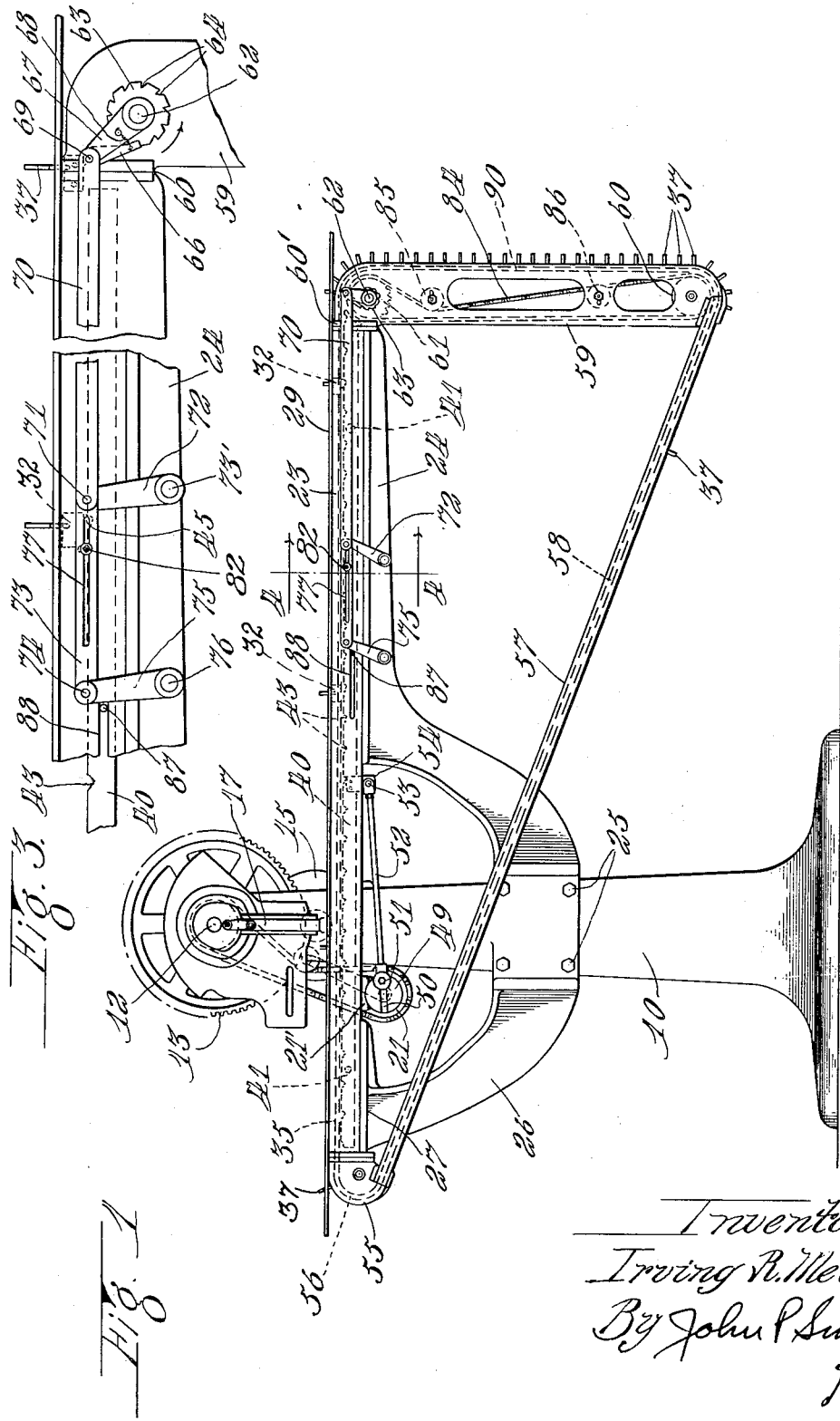
Inventor
Irving R. Metcalf.
By John P. Smith
Atty.

Aug. 1, 1933.   I. R. METCALF   1,920,417
CONVEYING MECHANISM FOR A STITCHING MACHINE AND THE LIKE
Filed May 27, 1929   2 Sheets-Sheet 2
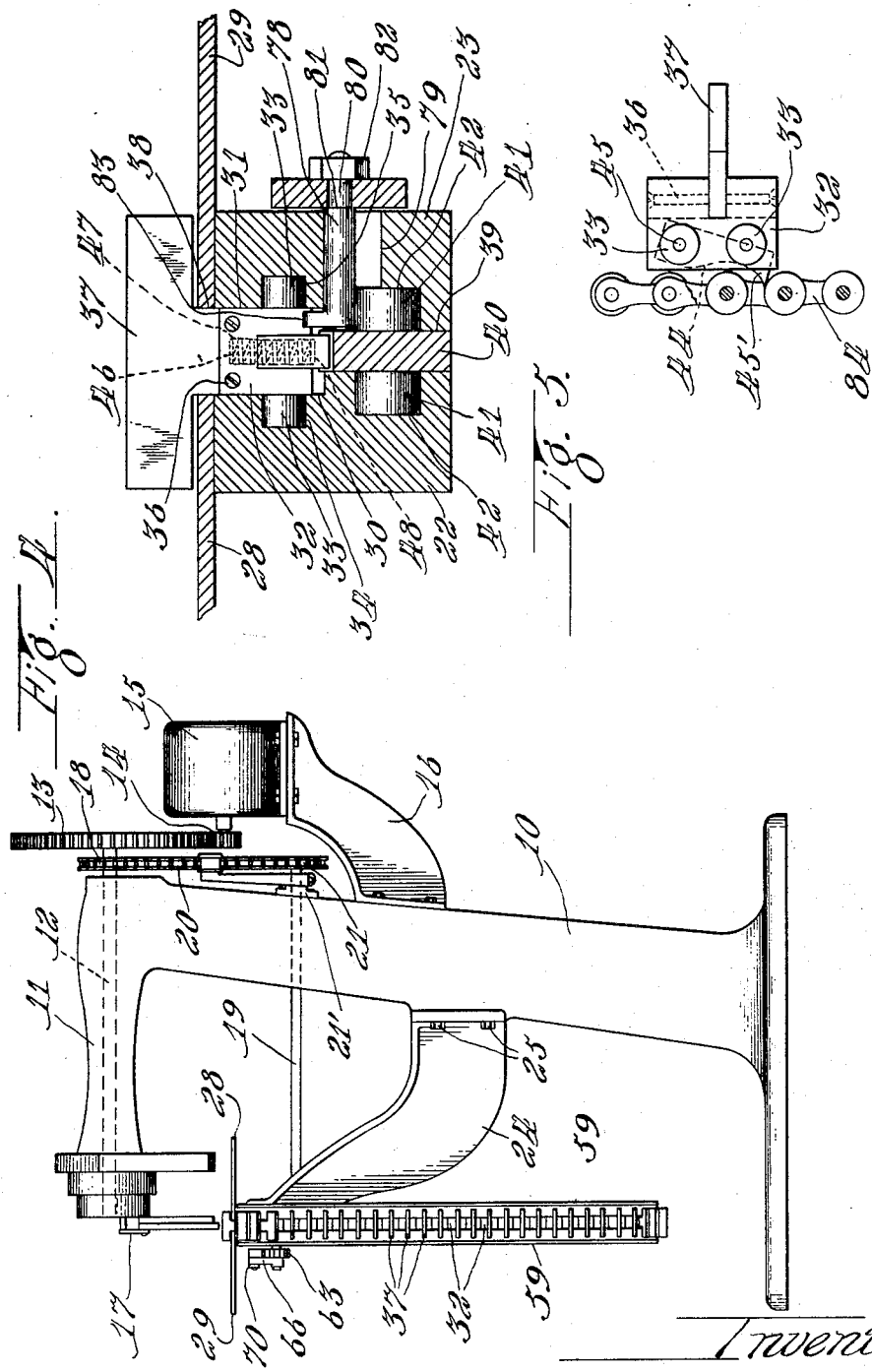
Inventor.
Irving R. Metcalf.
By John P Smith
Atty.

Patented Aug. 1, 1933

1,920,417

UNITED STATES PATENT OFFICE 1,920,417

CONVEYING MECHANISM FOR A STITCHING MACHINE AND THE LIKE

Irving R. Metcalf, St. Charles, Ill., assignor to Latham Machinery Company, a Corporation of Illinois Application May 27, 1929. Serial No. 366,210

37 Claims. (Cl. 198—221)

The present invention is directed to a novel, simplified and easily adjusted conveying mechanism for a stitching machine and the like.

One of the objects of the present invention is to provide a simple, novel and improved form of conveying mechanism for conveying paper pamphlets or box blanks of a construction in which the same may be easily adjusted to accommodate various sizes with a minimum amount of expenditure of time and labor.

A further object of the invention is to provide a novel and improved conveying mechanism for conveying paper pamphlets or box blanks or various other forms of materials to be worked upon to a stitching mechanism or the like, which are required to be intermittently fed to such mechanism.

A still further object of the invention is to provide a novel reciprocating mechanism for imparting a step by step movement to material to be fed to an intermittently operated mechanism for stitching or otherwise operating on the work and in which a conveying mechanism may be so adjusted to take care of various sizes of blanks to be worked upon.

A further object of the invention is to provide a novel and improved conveying mechanism for conveying material to a stitching mechanism by a step by step movement in which the length of the intermittent movement or step may be adjusted to vary the distances between the stitches or staples being driven into the work.

These and other objects are accomplished by providing a construction and an arrangement of the various parts in the manner hereinafter described and particularly pointed out in the appended claims.

Referring to the drawings, Fig. 1 is a side elevational view of a conventional form of a stitching mechanism showing my improved conveying mechanism mounted thereon.

Fig. 2 is a front elevational view of the same.

Fig. 3 is an enlarged fragmentary detailed view showing the intermittently actuated mechanism for elevating and advancing one of the conveying dogs.

Fig. 4 is a fragmentary cross-sectional view taken on the lines 4—4 in Fig. 1, and Fig. 5 is an enlarged detailed view showing the manner in which the elevating chain engages the dogs for elevating them to the conveyer table.

In the drawings, I have illustrated one application of my improved intermittently actuated conveying mechanism and shown the same in connection with a stitching machine for stitching pamphlets, books, box blanks and the like, but it will, of course, be understood that my improved conveying mechanism is adaptable for various other uses for feeding various types of blanks intermittently so that they may be worked upon by a machine other than a stitching machine and for that reason, I do not wish to be limited to any specific type of machine and I am, therefore, claiming the invention to all uses to which the same may be applied. For the purpose of illustration one application of my invention, I have shown the same in connection with a wire stitching machine which comprises a main frame or standard 10, having a horizontal arm 11. Mounted in the arm 11 is the usual main drive shaft 12 which is operatively driven by a gear 13 which in turn, meshes with a pinion 14 mounted on the drive shaft of an electric motor 15. The motor 15 is mounted on an arm 16 secured to the side of the standard 10. The outer end of the horizontal arm 11 is provided with a conventional form of stitcher head generally indicated by the reference character 17 which is operatively driven in the manner well understood in the art, by the main drive shaft 12 for forming and driving wire staples into the work beneath the stitcher head. Positioned adjacent the driving gear 13 and secured to the shaft 12 is a sprocket 18 which operatively drives a horizontal shaft 19 through the medium of the chain 20 and sprocket 21 secured to one end of the shaft 19. The shaft 19 is mounted in suitable bearings 21', one of which is attached to the standard 10 and the other of which may be attached to the under side of the work table.

My improved conveying mechanism for intermittently feeding blanks to the stitching mechanism of the machine comprises two longitudinally extending side frame members 22 and 23 which are secured at their forward end to a forwardly extending horizontal arm or frame member 24 which is secured to the main standard by means of bolts 25. This arm or frame member 24 has a rearwardly extending arm 26 formed integrally therewith which in turn, has a horizontally extending flange portion 27 which supports and has secured thereto the rearward end of the longitudinal frame members 22 and 23. Secured to the upper sides of the longitudinal frame members 22 and 23 are table members 28 and 29 over which the work is conveyed to the stitching mechanism. Each of the members 22 and 23 are provided with longitudinally extending recesses 30 and 31 between which is adapted to be longitudinally movable therein, conveyer dogs 32. These dogs 32 are provided with front and rear sets of rollers 33 which are adapted to ride and guide in longitudinal recesses 34 and 35 formed in each of the longitudinally extending conveyer frame members 22 and 23, respectively. Secured to the dog intermediate the ends thereof, by means of screws 36 are transversely extending work engaging lugs 37 which are preferably T shaped in form and have the lower stem thereof, extending into the longitudinal groove 38 formed between the two spaced apart table members 28 and 29. Each of the longitudinal conveyer frame members 22 and 23 are held in spaced relation so as to form a longitudinally extending slot 39 adjacent the lower side thereof. Mounted in this longitudinal slot 39 is a reciprocating bar 40. The bar 40 is guided in its reciprocatory movement by two pairs of oppositely disposed rollers 41 which in turn, are mounted in longitudinal slots 42 located in the opposite ends of each of the conveyer frame members 22 and 23, respectively. The upper edge of the bar 40 is provided with a plurality of spaced apart notches 43 which are adapted to engage pivoted pawls 44 pivoted on pins 45 in each of the dogs 32. The free ends of the pawls, as shown at 45', are pressed into engagement in one of the grooves 43 of the reciprocating bar 40 by means of compression springs 46 which are mounted in sockets 47 in each of the dogs 42. The lower end of the spring 46 is mounted in similar sockets 48 located in the free ends of the pawl. The spring 46 is a relatively light pressure spring and permits the pawls 44 to yield upwardly when the notches 43 on the bar 40 engage the pawls on the rearward movement of the bar 40, so that the conveying dogs remain stationary during the return stroke of the reciprocating bar. The reciprocating bar is actuated to and fro by means of a disk 49 which is secured to one end of the shaft 19. The disk 49 is provided with a diametral slot 50 in which an eccentric 51 may be adjusted transversely of the diameter of the disk for varying the length of the movement imparted to the dogs at each step in their movement across the frame. This eccentric 51 forms the pivotal connection for the rearward end of the pitman 52. The forward end of the pitman connection is connected, as shown at 53, to a downwardly extending bracket 54 which in turn, is secured to one side of the reciprocating bar 40. From the above description it will be seen that as the shaft 19 is rotated, the eccentric connection 51 and pitman 52 are reciprocated thereby reciprocating the bar 40 which in turn, by reason of the notches 43 engaging the pawls 45 of each of the dogs 32, they are advanced forwardly step by step from the front end of the conveyer table to and beyond the stitching mechanism 17. It will also be observed that by adjusting the eccentric 51, in the slot 50 of the disk 49, with respect to the axis of the disk, the length of each movement imparted to the reciprocating bar 40 may be increased or diminished, thereby increasing or diminishing the length of the movement of each step taken by the dogs in said travel across the frame. This adjustment obviously permits the operator to vary the distances between the stitches on the work being stitched. Secured to the rear end of the conveyer frame members 22 and 23 is a bracket 55 which has a circular recess therein, conforming to the recesses 31, 34 and 35 of the members 22 and 23 (see Fig. 4) so as to accommodate the dogs 32 as well as their rollers 33, so that these dogs may be discharged into the bracket and conveyed down by gravity by means of a guide or inclined track 57 which is formed by two oppositely disposed channel-shaped members 58. The lower end of this inclined guide frame 57 is secured to two side frame members 59 which has mounted therebetween, and at the lower end thereof, an idle roller 60. The upper ends of the frame members 59 are secured, as shown at 60', to the forward end of the conveyer frame members 22 and 23. Mounted between the side frame members 59 adjacent the upper end thereof, is a driving sprocket 61 secured to a shaft 62 mounted in the side frame members. Secured to the shaft 62 and on the outside of one of the side frame members 59 is a ratchet wheel 63, which is provided with a plurality of ratchet teeth 64. These ratchet teeth are adapted to be engaged by a spring pressed pawl 66 which, in turn, is pivoted on an arm 67 journaled on the shaft 62. The pawl 66 is normally pressed into engagement with the teeth 64 of the ratchet wheel 63 by means of a spring 68. The free end of the arm 67 is pivotally connected by means of a pin 69 to a reciprocating dog elevating bar 70. The rearward end of the bar 70 is pivotally connected by means of a pin 71 to an arm 72 which in turn, is pivoted to a pin 73' secured to the frame member 24. Pivoted concentrically with the pin 71 on the free end of the arm 72 is a second connecting bar 73 which has its rear end, as shown at 74, pivotally connected to an arm 75 which in turn, is pivoted on a pin 76 to the frame member 24. Adjustably mounted and adapted to be secured in the longitudinal slot 77 formed in the bar 73 is a ratchet actuating trip 78 which extends through a slot 79 formed in the conveyer side frame member 23. This trip 78 is provided with a reduced portion as shown at 80 so as to form a shoulder 81 for clamping the trip 78 at various positions of adjustment in the slot 77 by means of a nut 82, which is mounted in threaded engagement with the threaded end of the trip. The inner end of the trip 78 is provided with an upwardly extending projection 83 which is located in the path of travel of the dogs 32, as clearly shown in Fig. 4. From the above description, it will be seen that as the dog travels forwardly over the conveyer table by the operation of the step by step reciprocating bar 40, the dogs 32 will engage the upwardly projecting portion 83 of the trip 78 causing the bars 70 and 73 to move forwardly about their pivots 73' and 76, respectively, and swinging the arm 67 in a forward direction and thereby causing the ratchet wheel 63 to revolve in a direction indicated by the arrow in Fig. 3 by reason of the pawl 66 engaging the ratchet teeth thereof to position the next succeeding dog in position to be engaged by the reciprocating bar 40 in the manner hereinafter described. This movement intermittently rotates the shaft 62 thereby intermittently rotating the sprocket 61 which in turn, elevates one side 84 of the chain which in turn, is trained about the idle roller 60 and the drive sprocket 61. The chain 84 is trained about idle rollers 85 and 86. The lower end of the chain or that portion circulating the idle roller 60 is positioned and arranged to engage the free ends 45 of the pawls 44 in each of the dogs 32, as clearly shown in Fig. 5, so as to elevate the dogs into position to be engaged by the first or forward notch 43 in the reciprocating bar 40. The dog elevating mechanism is normally actuated back to the position shown in Fig. 1, from the position shown in Fig. 3, by a pin 87 which is secured to one side of the reciprocating bar 40 and extends through a slot 88 in the side frame member 22. This pin projects through this slot 88 and is located in the path of movement of the pivoted arm 75 so that on a forward movement of the bar 40 the pin actuates the arm 75 to the position shown in Fig. 1 and at the time that a succeeding dog 32 reaches the upwardly projecting portion 83 of the trip 78, the dog elevating mechanism or bars 70 and 77 are actuated to the position shown in Fig. 3 at which time and by reason of the pivotal connections 73' and 76 of the respective arms 72 and 75, the trip 78 swings downwardly in the slot 79 formed in the side frame member 23 so that the trip is out of the path and permits the dog to pass thereby. It will be further noted that on each reciprocation of the bar 40 a dog is not engaged by the bar except when a dog is properly positioned to be so engaged. In other words a dog is positioned to be engaged by the reciprocating bar 40 only after a preceding dog, in its travel across the table, engages the lug 83 so as to move the trip 78 longitudinally forward carrying with it the connecting bars 70 and 73. In doing so the next succeeding dog is positioned to be engaged by the reciprocating bar 40. In this connection it may be pointed out that the conveying mechanism may be adjusted so that there is a dog in each and every notch 43 of the reciprocating bar 40 moving intermittently across the table; or the mechanism may be adjusted so that there is one, two, three or more notches 43 between each of the successive dogs as they travel across the table. This arrangement obviously changes the spaced relation between the dogs as they are intermittently moved across the table for accommodating blanks of different lengths. It will, of course, be understood that the side frame members 59 are provided on their forward inner sides with vertically extending grooves 90 which are adapted to accommodate the rollers 33 of each of the dogs and properly conveying them to their position on the work supporting table.

Summarizing the operation of my improved conveying mechanism, it may be briefly stated as follows: Let us assume that the shaft 12 is being driven by the motor 18 in a manner for driving the staple mechanism in the manner well understood in the art and that through the chain connection 20 and sprockets 18 and 21, the shaft 19 is driven, which in turn, through the disk 49 and pitman connection 52 the notched bar 40 is reciprocated. On each reciprocation, the dogs 32 positioned on the top of the work table, are moved forwardly, intermittently or step by step, by reason of the pawls 44 of each of the dogs engaging one of the notches 43 in the reciprocating bar. As one of the dogs 32 is moved forwardly by the bar 40 so as to engage the upwardly extending projection 83 on the trip 78, the dog elevating mechanism which includes the bars 70 and 77, to which the trip 78 is adjustably secured, actuates the arm 67 from the position shown in Fig. 1, to that shown in Fig. 3, thereby revolving the shaft 62 and through the sprocket 61 the chain 84 or preferably, the forward side of the chain 84, is raised intermittently by this intermittent movement of the dog elevating bars 70 and 73 by reason of the pawls 44 of the lowermost dogs between the frame members 59 engaging the links in the manner clearly disclosed in Fig. 5, at which time the uppermost dog between the frames 59 is in a position to be engaged by the rearmost notch 43 of the reciprocating bar 40. On the next succeeding rearward movement of the reciprocating bar 40, the pin 87 which is attached to the bar 40 engages the pivoted arm 75 and throws the dog elevating mechanism rearwardly to the position shown in Fig. 1, preparatory to elevating and positioning the next succeeding dog for travel across the table. As the dogs travel forwardly on the table with the blank being worked upon therebetween, the dogs are discharged at the forward end of the table into the bracket 55 where they are conveyed by gravitation down the inclined guide way 57 to a position where they are again engaged by the chain 84 to be elevated. If it is found necessary to adjust the space between the dogs for accommodating different sizes of pamphlets or box blanks to be stitched, the trip 78 may be adjusted longitudinally in the slot 77 of the bar 73 and secured therein by means of the nut 82 so that various sizes of pamphlets or box blanks may be accommodated. From the above description, it will be seen that by providing the simple adjustment of the trip 78, a wide range and variation of pamphlets or boxes may be handled by mere simple adjustment and without the necessity of changing the position of the lugs on an endless chain as is now required in the conventional form of endless conveyer belts. It will be further noted that the distance between the staples may be increased or diminished so that additional or less staples may be placed in the work being stitched in accordance with the requirements of the operator by merely adjusting the position of the eccentric 51 in the slot 50 of the disk. This adjustment varies the length of each movement or step that the material being worked upon is advanced on each complete cycle of operation of the machine.

With these different ranges of adjustment, that is, one for controlling the distance between the dogs, and the other for varying the length of movement of the dogs on each step, affords a simple and compact conveying mechanism, capable of accommodating and handling materials of a wide range of sizes.

While in the above specification, I have described one embodiment which my invention may assume in practice it will, of course, be understood that the same is capable of modification and that modification may be made without departing from the spirit and scope of the invention as expressed in the following claims.

What I claim as my invention and desire to secure by Letters Patent is:

1. A conveying mechanism comprising a frame, conveying dogs mounted on said frame, power actuated means for actuating said dogs to move relatively with respect to each other, said actuating means imparting a step by step movement to said dogs, and means mounted on said frame for successively positioning said dogs whereby said dogs may be engaged by said actuating means.

2. A conveying mechanism comprising a frame, conveying dogs mounted on said frame, power actuating means for moving said dogs relatively with respect to each other, said actuating means being mounted on said frame for imparting a step by step movement to said dogs, and means mounted on said frame and actuated by said first named means for successively positioning said dogs to be engaged by said actuating means.

3. A conveying mechanism comprising a frame, a reciprocating means mounted on said frame, conveying dogs actuated by said means to move relatively with respect to each other and mounted on said frame, certain of said dogs remaining stationary while certain other of said dogs move, certain of said dogs being adapted to be engaged by said reciprocating means for intermittent movement in one direction, and means for positioning said dogs to be engaged by said reciprocating means.

4. A conveying mechanism comprising a frame, a reciprocating means mounted on said frame, relatively stationary and movable dogs mounted on said frame, said movable dogs adapted to be actuated by said reciprocating means to move them with respect to said relatively stationary dogs, and means actuated by said first named means for successively positioning said dogs to be engaged by said reciprocating means.

5. A conveying mechanism comprising a frame, a plurality of separately movable conveying dogs mounted on said frame, movable means mounted on said frame for imparting a step by step movement to said dogs, said movable means actuating certain of said dogs with respect to certain other of said dogs and means mounted on said frame actuated by said movable means for elevating and successively positioning said dogs to be engaged by said movable means.

6. A conveying mechanism comprising a frame, conveying dogs mounted on said frame, movable means mounted on said frame and engageable with said dogs for imparting an intermittent motion to said dogs in one direction, and means mounted on said frame and controlled by one of said dogs for successively positioning said dogs to be engaged by said movable means.

7. A conveying mechanism comprising a frame, conveying dogs mounted on said frame, movable means mounted on said frame and engageable with said dogs for imparting an intermittent motion to said dogs in one direction and means for successively advancing said dogs one at a time to be engaged by said movable means.

8. A conveying mechanism comprising a frame, conveying dogs mounted on said frame, a reciprocating member mounted on said frame and engageable with said dogs for advancing said dogs in spaced relation across said frame and means for collecting said dogs at one end of said frame and for positioning said dogs successively to be engaged by said reciprocating member.

9. A conveying mechanism comprising a frame, conveying dogs mounted on said frame, a reciprocating member mounted on said frame and engageable with said dogs for advancing said dogs in spaced relation across said frame, means for automatically advancing one dog at a time to be engaged by said reciprocating member, means for holding a plurality of said dogs at one end of said frame, and means for conveying said dogs from the other end of said frame to said holding means.

10. A conveying mechanism comprising a frame, conveying dogs mounted on said frame, a reciprocating member mounted on said frame and engageable with said dogs for advancing said dogs in spaced relation across said frame, means for holding a plurality of said dogs at one end of said frame and means for conveying said dogs from the other end of said frame to said holding means by gravity.

11. A conveying mechanism comprising a frame, conveying dogs mounted on said frame, a reciprocating bar mounted on said frame and having spaced apart notches therein, said dogs having means thereon for engaging said notches whereby said dogs are advanced across said frame in one direction, means for collecting said dogs at one end of said frame, means for elevating said dogs, and means mounted on said frame and actuated by said reciprocating bar and controlled by one of said dogs for successively advancing the dogs into a position to be engaged by said reciprocating bar.

12. A conveying mechanism comprising a frame, a reciprocating member movable in a rectilinear direction on said frame, a plurality of spaced apart notches formed in said member, dogs mounted on said frame, pawls mounted on said dogs and engageable with the notches on said reciprocating member for advancing said dogs in one direction across said frame, means for accumulating said dogs at one end of said frame, means for conveying said dogs from the other end of said frame to said first named means, an elevating chain mounted in said first named means for elevating said dogs and successively positioning the uppermost dog in a position to be engaged by said reciprocating member and means mounted on said frame and engageable by one of the dogs advancing across said frame for actuating said chain so as to successively position one dog at a time to be engaged by said reciprocating member.

13. A conveying mechanism, comprising a frame, conveying dogs mounted on said frame, movable means mounted on said frame for imparting a step by step movement to said dogs, and means controlled by said movable means for changing the spaced relation between said dogs.

14. A conveying mechanism comprising a frame, conveying dogs mounted on said frame, movable means mounted on said frame for imparting a step by step movement to said dogs, and means associated with said movable means and controlled by one of said dogs for changing the spaced relation between said dogs.

15. A conveying mechanism comprising a frame, conveying dogs mounted on said frame, movable means mounted on said frame for imparting a step by step movement to said dogs, means actuated by said movable means for positioning one dog at a time to be advanced across said frame, and means for adjusting said last named means whereby the spaced intervals between said dogs being advanced across said frame may be varied.

16. A conveying mechanism comprising a frame, reciprocating means mounted on said frame, conveying dogs mounted on said frame and adapted to be engaged by said reciprocating means for intermittently moving said dogs in one direction and means actuated by said reciprocating means and controlled by one of said dogs for changing the spaced relation between said dogs.

17. A conveying mechanism comprising a frame, conveying dogs mounted on said frame, a reciprocating member mounted on said frame and engageable with said dogs for advancing said dogs in spaced relation across said frame, means for automatically advancing one of said dogs in position to be engaged by said reciprocating member, and means actuated by said reciprocating means and controlled by one of said dogs for changing the spaced relation between said dogs.

18. A conveying mechanism comprising a frame, conveying dogs mounted on said frame, a reciprocating member mounted on said frame and engageable with said dogs for advancing said dogs in spaced relation across said frame, means for automatically advancing one dog at a time to be engaged by said reciprocating member, means actuated by said reciprocating member for positioning one dog at a time to be advanced across said frame, and means for adjusting said last named means whereby the spaced intervals between said dogs being advanced across said frame may be varied.

19. A conveying mechanism comprising a frame, conveying dogs mounted on said frame, a reciprocating member mounted on said frame and engageable with said dogs for advancing said dogs in spaced relation across said frame, means for holding a plurality of dogs at one end of said frame, means for conveying said dogs from the other end of said frame to said holding means by gravity, and means associated with said reciprocating member and controlled by one of said dogs for changing the spaced relation between said dogs.

20. A conveying mechanism comprising a frame, conveying dogs mounted on said frame, a reciprocating member mounted on said frame and engageable with said dogs for advancing said dogs in spaced relation across said frame, means for holding a plurality of dogs at one end of said frame, means for conveying said dogs from the other end of said frame to said holding means by gravity, and means actuated by said reciprocating member for positioning one dog at a time to be advanced across said frame, and means for adjusting said last named means whereby the spaced interval between the dogs being advanced across said frame may be varied.

21. A conveying mechanism comprising a frame, relatively stationary and relatively movable conveying dogs mounted on said frame, movable means mounted on said frame for imparting a step by step movement to said dogs, said movable means adapted to move certain of said dogs with respect to certain other of said dogs and means for varying the length of movement made by said dogs.

22. A conveying mechanism comprising a frame, conveying dogs mounted on said frame, movable means mounted on said frame for imparting a step by step movement to said dogs, means mounted on said frame for accumulating and means for successively positioning said dogs whereby said dogs may be engaged by said movable means, and means for varying the length of movement made by said dogs.

23. A conveying mechanism comprising a frame, conveying dogs mounted on said frame, means for accumulating said dogs, movable means mounted on said frame for imparting a step by step movement to said dogs, means mounted on said frame and actuated by said movable means for successively positioning said dogs to be engaged by said movable means, and means for varying the length of movement made by said dogs.

24. A conveying mechanism comprising a frame, a reciprocating means mounted on said frame, a plurality of conveying dogs mounted on said frame and adapted to be engaged by said reciprocating means for intermittently moving said dogs in one direction, certain of said dogs remaining stationary, while certain other of said dogs are being moved and means for varying the length of the intermittent movement of said dogs.

25. A conveying mechanism comprising a frame, a reciprocating means mounted on said frame, a plurality of conveying dogs mounted on said frame and adapted to be engaged by said reciprocating means for intermittently moving said dogs in one direction, means for maintaining certain of said dogs stationary while certain other of said dogs are being moved means for varying the length of the intermittent movement of said dogs, and means for positioning said dogs to be engaged by said reciprocating means.

26. A conveying mechanism comprising a frame, a reciprocating means mounted on said frame, conveying dogs mounted on said frame, certain of said dogs being accumulated, while certain other of said dogs being adapted to be engaged by said reciprocating means for intermittently moving said dogs in one direction, means actuated by said first named means for successively positioning said dogs to be engaged by said reciprocating means, and for varying the length of the intermittent movement of said dogs.

27. A conveying mechanism comprising a frame, a reciprocating means mounted on said frame, a plurality of conveying dogs mounted on said frame and adapted to be successively actuated by said reciprocating means for intermittently moving said dogs in one direction, means actuated by said first named means for successively positioning said dogs to be engaged by said reciprocating means, and means for adjusting said reciprocating means whereby the length of the intermittent movement of said dogs may be varied.

28. A conveying mechanism comprising a frame, conveying dogs mounted on said frame, movable means mounted on said frame for imparting a step by step movement to said dogs, means mounted on said frame actuated by said movable means for elevating and successively positioning said dogs to be engaged by said movable means, and means for adjusting said movable means whereby the length of the steps taken by said dogs may be varied.

29. A conveying mechanism comprising a frame, conveying dogs mounted on said frame, movable means mounted on said frame and engageable with said dogs for imparting an intermittent motion to said dogs in one direction, means mounted on said frame and controlled by one of said dogs for successively positioning said dogs to be engaged by said movable means, and means for varying the length of the intermittent motion imparted to said dogs.

30. A conveying mechanism comprising a frame, conveying dogs mounted on said frame, movable means mounted on said frame and engageable with said dogs for imparting an intermittent motion to said dogs in one direction, means for successively advancing said dogs one at a time to be engaged by said movable means, and means for adjusting the length of the intermittent motion imparted to said dogs.

31. A conveying mechanism comprising a frame, conveying dogs mounted on said frame, a reciprocating member mounted on said frame and engageable with said dogs for advancing said dogs in spaced relation across said frame, means for collecting said dogs at one end of said frame and for positioning said dogs successively to be engaged by said reciprocating member, and means for varying the length of the reciprocating motion of said reciprocating member.

32. A conveying mechanism comprising a frame, conveying dogs mounted on said frame, a reciprocating member mounted on said frame and engageable with said dogs for advancing said dogs in spaced relation across said frame, means for automatically advancing one dog at a time to be engaged by said reciprocating member, means for holding a plurality of dogs at one end of said frame, means for conveying said dogs from one end of said frame to said holding means, and means for varying the length of movement of said reciprocating member.

33. A conveying mechanism comprising a frame, conveying dogs mounted on said frame, movable means mounted on said frame for imparting a step by step movement to said dogs, means associated with said movable means for changing the spaced relation between said dogs, and means for varying the length of the steps imparted to said dogs.

34. A conveying mechanism comprising a frame, conveying dogs mounted on said frame, movable means mounted on said frame for imparting a step by step movement to said dogs, means associated with said movable means and controlled by one of said dogs, for changing the spaced relation between said dogs, and adjustable means whereby the length of the steps taken by said dogs may be varied.

35. A conveying mechanism, comprising a frame, reciprocating means mounted on said frame, conveying dogs mounted on said frame and adapted to be engaged by said reciprocating means for intermittently moving said dogs in one direction, means associated with said reciprocating means and controlled by one of said dogs for changing the spaced relation between said dogs, and means associated with said reciprocating means for varying the intermittent movement of said dogs across said frame.

36. A conveying mechanism comprising a frame, conveying dogs mounted on said frame, a reciprocating member mounted on said frame and engageable with said dogs for advancing said dogs in spaced relation across said frame, means for automatically advancing one dog at a time to be engaged by said reciprocating member, means actuated by said reciprocating member for positioning one dog at a time to be advanced across said frame, means for adjusting said last named means whereby the spaced intervals between said dogs being advanced across said frame may be varied, and means associated with said reciprocating member for varying the length of movement of said reciprocating member.

37. A conveying mechanism comprising a frame, conveying dogs mounted on said frame, a reciprocating member mounted on said frame and engageable with said dogs for advancing said dogs in spaced relation across said frame, means for holding a plurality of dogs at one end of said frame, means for conveying said dogs from the other end of said frame to said holding means by gravity, means associated with said reciprocating member and controlled by one of said dogs for changing the spaced relation between said dogs, and means associated with said reciprocating member for varying the length of the reciprocating motion of said member whereby the length of the advance of said dogs across said frame may be varied.

IRVING R. METCALF.